United States Patent [19]
Rodgers

[11] Patent Number: 4,947,641
[45] Date of Patent: Aug. 14, 1990

[54] PULSE ACCELERATING TURBINE

[75] Inventor: Colin Rodgers, San Diego, Calif.

[73] Assignee: Sundstrand Corporation, Rockford, Ill.

[21] Appl. No.: 210,376

[22] Filed: Jun. 23, 1988

[51] Int. Cl.$^5$ ............................................. F02C 7/27
[52] U.S. Cl. ................................ 60/39.142; 60/39.76; 60/39.8
[58] Field of Search ............. 60/39.142, 39.141, 39.76, 60/39.77, 39.78, 39.79, 39.8, 39.81

[56] References Cited

U.S. PATENT DOCUMENTS

| | | |
|---|---|---|
| 3,073,114 | 1/1963 | Wood. |
| 3,117,418 | 1/1964 | McCoy et al.. |
| 3,439,495 | 4/1969 | Binsley et al. ................ 60/39.142 |
| 4,161,102 | 7/1979 | Jasas et al. ................... 60/39.142 |
| 4,693,073 | 9/1987 | Blackburn ...................... 60/39.76 |
| 4,712,371 | 12/1987 | Weber ............................ 60/39.142 |

FOREIGN PATENT DOCUMENTS

| | | | |
|---|---|---|---|
| 1164542 | 10/1958 | France ................................ 60/39.141 |
| 322088 | 3/1970 | Sweden ............................. 60/39.141 |
| 616695 | 1/1949 | United Kingdom ............. 60/39.141 |

Primary Examiner—Donald E. Stout
Attorney, Agent, or Firm—Antonelli, Terry & Wands

[57] ABSTRACT

A self starting turbine (10) is disclosed. An auxiliary pulse combustor (23) is provided having a separate output nozzle (36) from the discharge orifice (20) of a constant pressure combustor (18) for providing pressure pulses which impinge on the blades (22) of the rotor (14) of the turbine to provide starting torque. The utilization of a separate pulse combustion chamber (24) and discharge orifice 36 having a cross-sectional area different from the discharge orifice (20) of the constant pressure combustor (18) permits efficient pulse operation without adversely affecting the operation of the constant pressure combustor during normal sustained operation of the turbine.

18 Claims, 1 Drawing Sheet

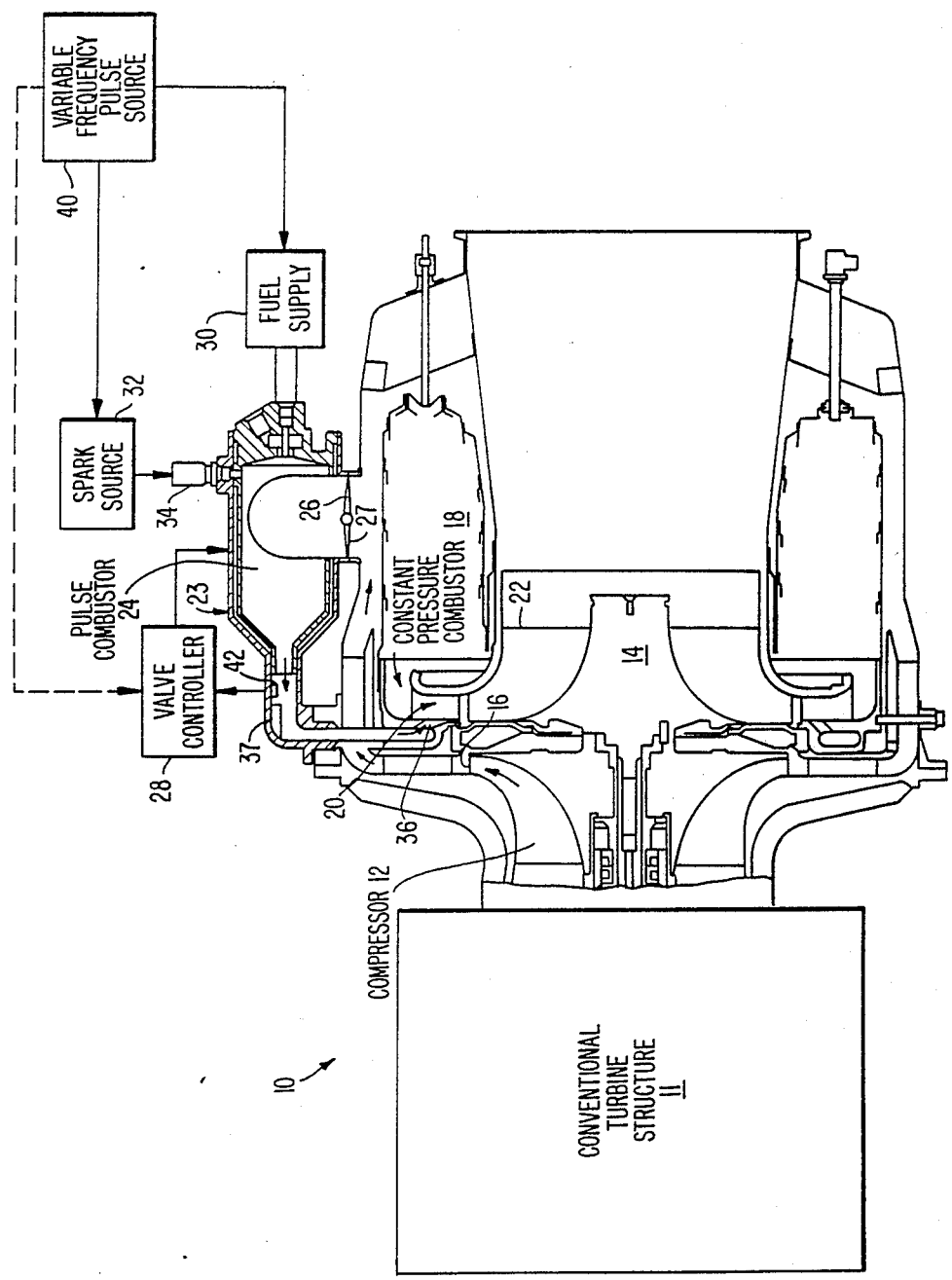

4,947,641

PULSE ACCELERATING TURBINE

TECHNICAL FIELD

The present invention relates to self starting gas turbines.

BACKGROUND ART

Typically, gas turbines are started by an auxiliary power source which may be an electric motor or a source of pressurized air. To start gas turbines based upon constant pressure combustion under the Brayton cycle, acceleration of the rotor to a rotational velocity is required by the auxiliary starter to a point where the net power output of the constant pressure combustor of the engine more than balances friction drag of the engine. In situations such as an Arctic environment, starting of turbines can be difficult because of the inefficiency of batteries used for powering the electric starter motor.

U.S. Pat. No. 3,439,495 discloses a self starting turbine which has a separate chamber which discharges pulses of combustion products through the main burner into a ring of nozzles to the turbine rotor blades or directly into the ring of nozzles to the turbine rotor blades. The pulses are used to accelerate the turbine rotor to a velocity sufficient to cause the compressor to provide gas at a sufficient pressure to make the main burner self sustaining to accelerate the turbine rotor up to operating speed. The turbine disclosed in the '495 patent utilizes the same ring of nozzles for impinging hot gases onto the turbine rotor which are produced by the pulse combustor and the main combustor. The flow through characteristics of the nozzles necessary to support efficient operation of the main burner do not maximize pressures achieved by the pulse combustor because of the relatively large cross-sectional area of the nozzles which impinge the gas combustion products onto the turbine rotor blades. The pulse combustor is not aspirated by air provided by the compressor.

DISCLOSURE OF INVENTION

The present invention provides a self starting turbine having a constant pressure combustor which utilizes a separate pulse combustor and associated impingement nozzle for directing pulses of gas combustion products onto the rotor blades of the turbine which nozzle is optimally sized to achieve efficient maximum pressure pulses. The normal operation of the constant pressure combustor, which has a separate nozzle for discharging gas combustion products into contact with the rotor blades to achieve normal constant pressure operation, is not influenced by the pulse combustor and associated discharge nozzle. The invention further has the advantage that the compressor geometry and constant pressure combustor configuration is of conventional design intended for maximum efficiency of the constant pressure combustor.

A self starting gas turbine engine in accordance with the invention includes a turbine having a rotor which rotates in response to gas combustion products impinging on turbine blades contained in the rotor; a compressor, rotatably driven by the turbine, for compressing gas which is drawn into the compressor; a constant pressure combustor, coupled to a fuel supply and to an output of the compressor, for burning fuel delivered to the combustor and providing pressurized gas combustion products at an output of the combustor, the constant pressure gas output directing the gas combustion products against the blades of the rotor to cause rotation; a pulse combustor, coupled to a fuel supply and the output of the compressor, and having an ignitor for periodically igniting a mixture of fuel and gas within the pulse combustor for providing pulses of pressurized gas combustion products at an output of the pulse combustor, the output of the pulse combustor being separate from the output of the constant pressure combustor and directed against the blades of the rotor. The pulse combustor receives pressurized gas from the compressor when the compressor is rotatably driven. The cross-sectional area of the output of the pulse combustor is smaller than the output of constant pressure combustor to enhance pressure build up within the pulse combustor upon ignition of a gas fuel mixture within the pulse combustor. The intake of the pulse combustor is coupled to the compressor to receive pressurized gas from the compressor. A valve is disposed in the intake which periodically opens to permit gas to enter the pulse combustor and which periodically closes to close the intake so that the output of the pulse combustor is the only output for pressurized gas upon combustion of fuel within the pulse combustor. A source of high voltage pulses is provided to the ignitor to cause ignition of a gas fuel mixture within the pulse combustor. The source of high voltage pulses supplies pulses with a variable frequency rate with the frequency of the pulses having a lowest rate upon initiation of starting of the turbine and progressively increasing as the rotational velocity of the rotor increases. A valve control controls the opening of the valve to permit fresh air to be taken in and closes the valve prior to production of a high voltage pulse by the source for supplying high voltage pulses. The valve control causes the valve to close after elapsing of a time interval measured from the opening of the valve which may proportionally decrease as the frequency of the high voltage pulses increases. A variable frequency pulse source controls the frequency at which high voltage pulses and fuel is provided to the pulse combustor. A pressure detector may be provided in the pulse combustor for detecting pressure within the pulse combustor and producing a signal when pressure within the pulse combustor drops below a predetermined level. The valve control may be controlled by the signal produced by the pressure detector.

BRIEF DESCRIPTION OF THE DRAWINGS

The Figure illustrates an embodiment of the present invention.

BEST MODE FOR CARRYING OUT THE INVENTION

The Figure illustrates an embodiment of a self starting turbine 10 in accordance with the present invention. The invention utilizes a turbine of conventional design operating according to the Brayton cycle. The details of conventional structure 11 have not been illustrated in detail as they are not necessary for understanding the invention. The turbine has a compressor 12 which is powered by the rotor 14 of the turbine to compress gas drawn into the compressor which is discharged from the orifice 16 of the compressor into a constant pressure combustor 18 of conventional design which has a discharge orifice 20 which impinges hot high pressure combustion gases onto the blades 22 of the rotor 14 to produce rotation. The aforementioned structure provides rotary power to rotate the rotor and compressor during normal operation in the well known manner, but cannot supply sufficient starting torque to operate the constant pressure combustor until the rotor reaches a predetermined speed which is necessary to provide sufficient pressurized gas to the input of the constant pressure combustor 18 to have self sustained operation.

A pulse combustor 23 is provided for producing starting torque for the turbine without the application of auxiliary power from a conventional electric or pneumatic starter. The pulse combustor has a combustion chamber 24 into which is introduced air when valve 26 is rotated to an opened position 90° from that as illustrated in the Figure. The combustion chamber has a relatively large volume in which combustion is initiated and a tapered discharge which necks down into a discharge nozzle 36 which is proximate to the blades 22 of the turbine rotor 14. The volume and taper of the combustion chamber 24 is chosen to maximize the production of high kinetic energy combustion gases which will quickly accelerate the rotor 14 up to a rotational velocity at which the operation of the constant pressure combustor 18 is self sustaining to permit the pulse combustor to be shut off. The cross sectional area of the intake 27 is larger than the cross sectional area of the discharge nozzle to provide rapid intake of air while maximizing pressure buildup during combustion. However, the nozzle cross sectional area should not be so small to interfere with the intake of fresh air after combustion. After intake of air, the valve controller 28 rotates the valve 26 to the position as illustrated, a pulse of fuel is introduced into the chamber 24 from the fuel supply 30 and ignited by a high voltage pulse supplied from spark source 32 to ignitor plug 34. The rotation of the valve 26 to the position as illustrated by the valve controller 28 permits the combustion of a fuel gas mixture within the chamber 24 to produce a high pressure pulse which is discharged from the discharge nozzle 36 to impinge upon the blades 22 of the turbine rotor 14. When a valve rotates 90° from the position as illustrated, the interior of the combustion chamber is in fluid communication with air flowing from the discharge orifice 16 of the compressor 12 which also flows into the constant pressure combustor 18 in a conventional manner.

A variable frequency pulse source 40 of conventional design is provided which produces control pulses having a first minimum frequency which is utilized during the initiation of starting of the turbine. The frequency of the pulses is increased by the variable frequency pulse source 40 preferably linearly over a predetermined time interval which defines the start cycle for the turbine. The interval may be a period from approximately 5 to 20 seconds which is the time interval required to accelerate the rotor 14 of the turbine from a stop to a rotational velocity which causes the compressor to provide pressurized air from the orifice 16 of a pressure sufficient to make the constant pressure combustion process produced by the constant pressure combustor 18 self sustaining. Thereafter, the pulse combustor 23 may be disabled. The valve controller 28 may be controlled by a pressure transducer 42 which is mounted in the tapered portion of the discharge nozzle 37 to the discharge nozzle 36 of the combustion chamber 24 to sense the pressure of the discharge gas dropping from a maximum pressure. The valve controller may initiate opening of the valve 26 after a predetermined time interval after the pressure sensed by the pressure transducer 42 drops from a maximum. The sensing of the dropping of the output pressure from the gas from the combustion chamber 24 may be sensed by differentiation of the output signal of the pressure transducer 42 to detect a negative slope or alternatively by other known electronic circuits utilizing comparators, etc. Alternatively, the valve controller 28 may be controlled by the variable frequency pulse source to cause the valve 26 to open a predetermined interval after the spark source 32 has applied a high voltage pulse to the ignitor 34 to cause combustion in the combustion chamber 24. This control has been illustrated by a dotted line. It should be understood that the present invention is not limited to any precise circuitry or timing sequence for controlling the operation of the valve 26, fuel supply 30 and spark source 32. The overall time sequence is that the valve 26 must open first to permit air to be introduced into the combustion chamber 24, the valve must be closed to close the combustion chamber to create a chamber which is closed with the exception of the output 36 to permit a semi-constant volume combustion process to take place, fuel must be introduced into the combustion chamber and finally the combustible mixture in the combustion chamber must be ignited by the application of a high voltage pulse from the spark source 32 to the ignitor 34. The rate at which the aforementioned sequence occurs is directly proportional to the frequency of the pulses produced by the variable frequency pulse source 40 during start up. The relative timing of the sequencing of the valve 26, fuel supply 30 and spark source 32 may be synchronized by the pulses from the variable frequency pulse source 40 with suitable time delays being provided electronically or mechanically between each of the aforementioned events.

While the foregoing invention has been described in terms of a preferred embodiment, it should be understood that numerous modifications may be made thereto without departing from the spirit and scope of the appended claims. It is intended that all such modifications falls within the scope of the appended claims.

I claim:

1. A self-starting turbine engine comprising:
   a turbine having a rotor which rotates in response to gas impinging on turbine blades contained in the rotor;
   a compressor rotatably driven by the turbine, for compressing gas which is drawn into the compressor and providing an output of compressed gas;
   a constant pressure combustor, coupled to a fuel supply and to the output of the compressor, for burning fuel delivered to the combustor and providing pressurized gas combustion products at an end of the combustor, the constant pressure gas output directing the gas combustion products against the turbine blades of the rotor to cause rotation; and
   a pulse combustor, coupled to a fuel supply and to the output of the compressor for providing compressed gas to a combustion chamber of the pulse combustor, an ignitor for periodically igniting a mixture of fuel and gas within the pulse combustor for providing pulses of pressurized combustion products as an output of the pulse combustor, the output of the pulse combustor being directed against the turbine blades of the rotor, and wherein the output of the pulse combustor is such that a pressure buildup within the pulse combustor is anhanced upon ignition of a gas fuel mixture within the pulse combustor.

2. A self-starting turbine in accordance with claim 1, wherein:
   the output of the pulse combustor is separate from the output of the constant pressure combustor.

3. A self-starting turbine comprising:
   a turbine having a rotor which rotates in response to gas inpinging on turbine blades contained in the rotor;
   a compressor, rotatably driven by the turbine, for compressing gas which is drawn into the compressor;
   a constant pressure combustor, coupled to a fuel supply and to an putput of the compressor, for burning fuel delivered to the combustor and providing pressurized gas combustion products at an output of the combustor, the constant pressure gas output directing the gas combustion products against the turbine blades of the rotor to cause rotation; and
   a pulse combustor, coupled to a fuel supply and to the output of the compressor for providing compressed gas to a combustion chamber of the pulse combustor, and an ignitor for periodically igniting a mixture of fuel and gas within the pulse combustor for providing pulses of pressurized combustion products as an output separate from the output of the constant pressure combustor, the output of the pulse combustor being directed against the turbine blades of the rotor and having a cross-sectional area smaller than a cross-sectional area of the output of the constant pressure combustor and smaller than an intake of the pulse combustor to enhance pressure buildup within the pulse combustor upon ignition of a gas fuel mixture within the pulse combustor.

4. A self starting turbine in accordance with claim 3, wherein:
   the intake of the pulse combustor is coupled to the compressor to receive pressurized gas from the compressor and further comprising;
   a valve disposed in the intake which periodically opens to permit gas from the compressor to enter the pulse combustor and which periodically closes to close the intake so that the output of the pulse combustor is the only output for pressured gas combustion products upon combustion of fuel within the pulse combustor; and
   means for supplying high voltage pulses to the ignitor to cause ignition of a gas fuel mixture within the pulse combustor.

5. A self starting turbine in accordance with claim 4, wherein:
   the means for supplying high voltage pulses supplies pulses with a variable frequency rate with the frequency of the pulses having a lowest rate upon initiation of starting of the turbine and progressively increasing as the rotational velocity of the rotor increases.

6. A self starting turbine in accordance with claim 5 further comprising:
   pressure detecting means in the pulse combustor for detecting pressure within the pulse combustor and producing a signal when pressure within the pulse combustor drops below a predetermined level; and
   a valve control means, responsive to the pressure detecting means, for opening the valve in response to the signal and closing the valve prior to the production of a high voltage pulse by the means for supplying high voltage pulses.

7. A self starting turbine in accordance with claim 6, wherein:
   the valve control means causes the valve to close after a time interval elapses measured from the opening of the valve.

8. A self starting turbine in accordance with claim 7, wherein:
   the time interval proportionately decreases as the frequency of a rate at which the high voltage pulses occur.

9. A self starting turbine in accordance with claim 7 further comprising:
   a variable frequency pulse source, coupled to the means for supplying high voltage pulses and to the fuel supply, for controlling the frequency of occurrence of the high voltage pulses and the frequency of the delivery of fuel to the pulse combustor.

10. A self starting turbine in accordance with claim 5, wherein:
    the variable frequency pulse source is coupled to the valve control means for controlling the opening and closing of the valve in synchronism with the production of pulses by the variable frequency pulse source.

11. A self-starting turbine comprising:
    a turbine having a rotor which rotates in response to gas impinging on turbine blades contained in the rotor;
    a compressor, rotatably driven by the turbine, for compressing gas which is drawn into the compressor;
    a constant pressure combustor, coupled to a fuel supply and to an output of the compressor, for burning fuel delivered to the combustor and providing pressurized gas combustion products at an output of the combustor, the constant pressure gas output directing the gas combustion products against the turbine blades of the rotor to cause rotation; and
    a pulse combustor, coupled to a fuel supply and to the output of the compressor for providing compressed gas to a combustion chamber of the pulse combustor, an ignitor for periodically igniting a mixture of fuel and gas within the pulse combustor for providing pulses of pressurized combustion products as an output, the output of the pulse combustor being directed against the turbine blades of the rotor and having a cross-sectional area smaller than a Cross-sectional area of the output of the constant pressure combustor and smaller than an intake of the pulse combustor to enhance pressure buildup within the pulse combustor upon ignition of a gas fuel mixture within the pulse combustor.

12. A self starting turbine in accordance with claim 11, wherein:
    the intake of the pulse combustor is coupled to the compressor to receive pressurized gas from the compressor and further comprising;
    a valve disposed in the intake which periodically opens to permit gas from the compressor to enter the pulse combustor and which periodically closes to close the intake so that the output of the pulse combustor is the only output for pressured gas combustion products upon combustion of fuel within the pulse combustor; and
    means for supplying high voltage pulses to the ignitor to cause ignition of a gas fuel mixture within the pulse combustor.

13. A self starting turbine in accordance with claim 12, wherein:
the means for supplying high voltage pulses supplies pulses with a variable frequency rate with the frequency of the pulses having a lowest rate upon initiation of starting of the turbine and progressively increasing as the rotational velocity of the rotor increases.

14. A self starting turbine in accordance with claim 13 further comprising:
pressure detecting means in the pulse combustor for detecting pressure within the pulse combustor and producing a signal when pressure within the pulse combustor drops below a predetermined level; and
a valve control means, responsive to the pressure detecting means, for opening the valve in response to the signal and closing the valve prior to the production of a high voltage pulse by the means for supplying high voltage pulses.

15. A self starting turbine in accordance with claim 14, wherein:
the valve control means causes the valve to close after a time interval elapses measured from the opening of the valve.

16. A self starting turbine in accordance with claim 15, wherein:
the time interval proportionately decreases as the frequency of a rate at which the high voltage pulses occur.

17. A self starting turbine in accordance with claim 15 further comprising:
a variable frequency pulse source, coupled to the means for supplying high voltage pulses and to the fuel supply, for controlling the frequency of occurrence of the high voltage pulses and the frequency of the delivery of fuel to the pulse combustor.

18. A self starting turbine in accordance with claim 13, wherein:
the variable frequency pulse source is coupled to the valve control means for controlling the opening and closing of the valve in synchronism with the production of pulses by the variable frequency pulse source.

* * * * *